(12) United States Patent
Liu et al.

(10) Patent No.: US 8,007,729 B2
(45) Date of Patent: Aug. 30, 2011

(54) APPARATUS FOR FEED PREHEATING WITH FLUE GAS COOLER

(75) Inventors: Yunbo Liu, Beijing (CN); Xin X. Zhu, Long Grove, IL (US); Daniel N. Myers, Arlington Heights, IL (US); Patrick D. Walker, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 244 days.

(21) Appl. No.: 12/408,060

(22) Filed: Mar. 20, 2009

(65) Prior Publication Data
US 2010/0239475 A1 Sep. 23, 2010

(51) Int. Cl.
*F27B 15/08* (2006.01)
*F01K 17/00* (2006.01)
*F01K 13/00* (2006.01)

(52) U.S. Cl. ........ 422/144; 422/139; 422/141; 422/143; 422/145; 422/146; 422/147; 60/648; 60/676; 165/66

(58) Field of Classification Search .................. 422/144, 422/139, 141, 143, 145, 146, 147; 60/648, 60/676; 165/66
See application file for complete search history.

(56) References Cited

U.S. PATENT DOCUMENTS

| | | | | |
|---|---|---|---|---|
| 3,363,993 A | * | 1/1968 | Campbell | 422/170 |
| 3,844,734 A | * | 10/1974 | Johnson | 48/213 |
| 5,251,432 A | * | 10/1993 | Bruckner et al. | 60/772 |
| 5,345,755 A | * | 9/1994 | Bruckner et al. | 60/39.12 |
| 6,558,530 B2 | | 5/2003 | Schlosser et al. | |
| 6,793,804 B1 | | 9/2004 | Lindsay et al. | |
| 7,082,787 B2 | | 8/2006 | Lee et al. | |
| 7,404,891 B2 | | 7/2008 | van Egmond et al. | |
| 7,686,944 B2 | | 3/2010 | Zhu et al. | |
| 7,799,288 B2 | | 9/2010 | Petri | |
| 2004/0025510 A1 | * | 2/2004 | Schwarzott | 60/772 |
| 2005/0238548 A1 | * | 10/2005 | van Egmond et al. | 422/146 |
| 2006/0260981 A1 | | 11/2006 | Gosling | |
| 2007/0209367 A1 | | 9/2007 | Bell et al. | |
| 2009/0000906 A1 | | 1/2009 | Petri | |
| 2009/0000987 A1 | | 1/2009 | Petri | |
| 2009/0032438 A1 | | 2/2009 | Zhu et al. | |
| 2009/0035193 A1 | | 2/2009 | Zhu et al. | |
| 2010/0236982 A1 | | 9/2010 | Liu et al. | |

OTHER PUBLICATIONS

Couch, K., Concepts for an Overall Refinery Energy Solution Through Novel Integration of FCC Flu Gas Power Recovers, NPRA Annual Mtg 2006, Salt Lake City, UT.
Chen, E., "Understand FCCU heat integration", Foster Wheeler, Hydrocarbon Processing, Nov. 2002, Houston, TX, p. 67.
Yang, H., "Energy Saving in the Design of Regenerator Flue Gas Duct for FCC Unit", Petrol. Ref. Engineering 37(1), 2007. p. 52-54, Editorial Office, China.
Yong, Lui, "Improving the Utilization of Heat Energy of FCC Flud Gas", Jingmen Gen. Petrochemical Works, Jingmen 448002, Research Inst. of China Ship Construction Co., Feb. 20, 2003.

(Continued)

*Primary Examiner* — Walter Griffin
*Assistant Examiner* — Huy-Tram Nguyen
(74) *Attorney, Agent, or Firm* — James C. Paschall

(57) ABSTRACT

Hydrocarbon feed to a catalytic reactor can be heat exchanged with flue gas from a catalyst regenerator. This innovation enables recovery of more energy from flue gas thus resulting in a lower flue gas discharge temperature. As a result, other hot hydrocarbon streams conventionally used to preheat hydrocarbon feed can now be used to generate more high pressure steam.

17 Claims, 1 Drawing Sheet

OTHER PUBLICATIONS

Jorgensen, P., "Progress in Energy Conservation Methods in Petroleum Refineries/Energy Recovery . . . ", Assoc. Fr. Tech. Pet. Conf., Paris, Apr. 28, 1982, N290 19-29.

Hall, S.G., "Use Process Integration to Improve FCC./VRU Design" M.W. Kollogg Company, Houston, TX., Hydrocarbon Processing, Mar. 1995, pp. 63-74.

* cited by examiner

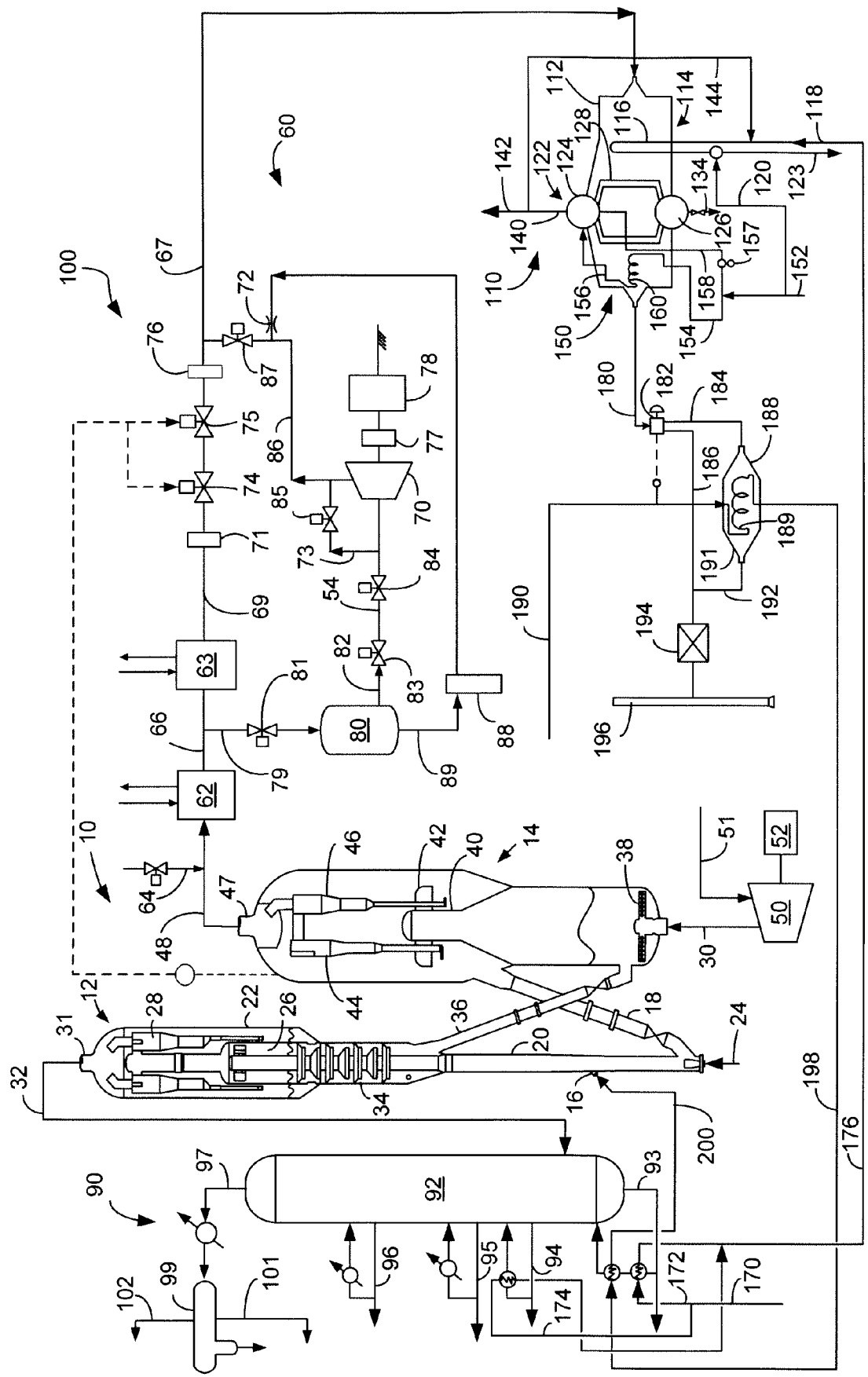

US 8,007,729 B2

APPARATUS FOR FEED PREHEATING WITH FLUE GAS COOLER

FIELD OF THE INVENTION

The field of the invention is the recovery of heat from a flue gas exhausted from a catalyst regenerator.

BACKGROUND OF THE INVENTION

Many hydrocarbon processes comprise a reactor that is closely coupled with a regenerator, followed by downstream hydrocarbon product separation. Hydrocarbon feed contacts catalyst in the reactor to convert the hydrocarbons down to desirable products. During this process, the catalyst tends to accumulate coke thereon, which is burned off in the regenerator.

In one such process, fluid catalytic cracking (FCC), the heat of combustion in the regenerator typically produces flue gas at temperatures of 677° to 788° C. (1250° to 1450° F.) and at a pressure range of 138 to 276 kPa (20 to 40 psig). Although the pressure is relatively low, the extremely high temperature, high volume of flue gas from the regenerator contains sufficient energy to warrant economic recovery.

To recover energy from a flue gas stream, flue gas may be fed to a power recovery unit. A power recovery train may include several devices, such as an expander turbine, a generator, an air blower, a gear reducer, and a let-down steam turbine. The energy of the flue gas is transferred through blades of the expander to a rotor coupled either to a main air blower, to produce combustion air for the regenerator, and/or to a generator to produce electrical power. Because of the pressure drop of 138 to 207 kPa (20 to 30 psi) across the expander turbine, the flue gas typically discharges with a temperature drop of approximately 125° to 167° C. (225° to 300° F.). The flue gas may be run to a flue gas steam generator for further energy recovery and cooling the flue gas.

A typical flue gas steam generator for an FCC unit contains three coils, namely an economizer for preheating boiler feed water, an evaporator for generating high pressure steam and a super heater for heating the high pressure steam into superheated steam. After removing fines, the cooled flue gas may then be discharged into the stack.

Lower flue gas discharge temperatures indicate greater heat recovery from the flue gas. However, the minimum flue gas discharge temperature is limited by the sulfuric acid dew point. A sufficient temperature approach above the dew point is required for flue gas to avoid sulfuric acid condensation in the stack which can lead to sulfuric acid precipitation in the vicinity of the stack.

In an FCC unit, hydrocarbon feed such as vacuum gas oil (VGO) is typically preheated by indirect heat exchange with a slurry oil pump around from the main fractionation column. The main fractionation column receives hot FCC products. The feed heat exchange with the slurry oil pump around helps to cool FCC products.

There is need for improved recovery of heat from catalyst regenerator flue gas.

SUMMARY OF THE INVENTION

We have found that the catalyst regenerator flue gas is an excellent material for indirectly heat exchanging with hydrocarbon feed. We have discovered that an FCC flue gas temperature leaving a heat exchange with the feed can be sufficiently above the sulfuric acid dew point to safely avoid the risk of condensation of sulfuric acid. By indirectly preheating hydrocarbon feed with flue gas to preheat the hydrocarbon feed to a higher temperature, the FCC product stream conventionally used for preheating the feed can be available for other heat recovery opportunities or for steam or power generation. Additionally, the flue gas is hot enough to partially or fully vaporize the hydrocarbon feed or preheat the feed to a temperature that is greater than conventionally achieved by heat exchange with FCC product streams. Consequently, the amount of coke that must be produced and burned in the FCC regenerator to sufficiently heat the catalyst and vaporize the feed in an FCC riser is reduced thereby producing less carbon dioxide.

Advantageously, the process and apparatus can enable greater heat recovery from a catalyst regenerator flue gas.

Additional features and advantages of the invention will be apparent from the description of the invention, the FIGURE and claims provided herein.

BRIEF DESCRIPTION OF THE DRAWING

The FIGURE is a schematic drawing of an FCC unit, a power recovery section and an FCC product recovery system in a refinery.

DETAILED DESCRIPTION

The present invention can be applied to any catalytic conversion process that employs a catalyst regenerator such as an oxygenate-to-olefin or an FCC unit. For ease of description, the present invention will be described with reference to an FCC unit. The discharge temperature for a conventional FCC flue gas cooler is typically around 288° C. (550° F.). We have found that the flue gas cooler discharge temperature is often limited by the pinch temperature in the steam generator, not the sulfuric acid dew point as commonly believed. Consequently, we have found that the flue gas exhausted to the stack at 288° C. (550° F.) still contains substantial useable heat that can be used to preheat a hydrocarbon feed stream to the catalytic reactor.

In an FCC unit in which the hydrocarbon feed is largely preheated with flue gas, the FCC product streams previously used for feed preheating, such as heavy cycle oil (HCO) and slurry oil, are now available for generating more high pressure steam. In a conventional design, the boiler feed water (BFW) preheating is provided by indirect heat exchange with saturated water from a steam drum to increase the BFW temperature to about 177° C. (350° F.), which is required for preventing corrosion in the flue gas cooler.

Now turning to the FIGURE, wherein like numerals designate like components, the FIGURE illustrates a refinery complex 100 that generally includes an FCC unit section 10, a power recovery section 60 and a product recovery section 90. The FCC unit section 10 includes a reactor 12 and a catalyst regenerator 14. Process variables typically include a cracking reaction temperature of 400° to 600° C. and a catalyst regeneration temperature of 500° to 900° C. Both the cracking and regeneration occur at an absolute pressure below 5 atmospheres.

The FIGURE shows a typical FCC reactor 12 in which a heavy hydrocarbon feed or raw oil stream in a distributor 16 is contacted with a regenerated cracking catalyst entering from a regenerated catalyst standpipe 18. This contacting may occur in a narrow riser 20, extending upwardly to the bottom of a reactor vessel 22. The contacting of feed and catalyst is fluidized by gas from a fluidizing line 24. In an embodiment, heat from the catalyst vaporizes the hydrocarbon feed or oil, and the hydrocarbon feed is thereafter cracked to lighter molecular weight hydrocarbons in the presence of the catalyst as both are transferred up the riser 20 into the reactor vessel 22. The cracked light hydrocarbon products are thereafter separated from the cracking catalyst using cyclonic separators which may include a primary separator 26 and one or two stages cyclones 28 in the reactor vessel 22. Gaseous, cracked products exit the reactor vessel 22 through a product outlet 31 to line 32 for transport to a downstream product recovery section 90. Inevitable side reactions occur in the riser 20 leaving coke deposits on the catalyst that lower catalyst activity. The spent or coked catalyst requires regeneration for further use. Coked catalyst, after separation from the gaseous product hydrocarbons, falls into a stripping section 34 where steam is injected through a nozzle to purge any residual hydrocarbon vapor. After the stripping operation, the coked catalyst is carried to the catalyst regenerator 14 through a spent catalyst standpipe 36.

The FIGURE depicts a regenerator 14 known as a combustor. However, other types of regenerators are suitable. In the catalyst regenerator 14, a stream of oxygen-containing gas, such as air, is introduced through an air distributor 38 to contact the coked catalyst, combust coke deposited thereon, and provide regenerated catalyst and flue gas. A main air blower 50 is driven by a driver 52 to deliver air or other oxygen containing gas from line 51 into the regenerator 14 through line 30. The driver 52 may be, for example, a motor, a steam turbine driver, or some other device for power input. The catalyst regeneration process adds a substantial amount of heat to the catalyst, providing energy to offset the endothermic cracking reactions occurring in the reactor riser 20. Catalyst and air flow upwardly together along a combustor riser 40 located within the catalyst regenerator 14 and, after regeneration, are initially separated by discharge through a disengager 42. Additional recovery of the regenerated catalyst and flue gas exiting the disengager 42 is achieved using first and second stage separator cyclones 44, 46, respectively within the catalyst regenerator 14. Catalyst separated from flue gas dispenses through a diplegs from cyclones 44, 46 while flue gas relatively lighter in catalyst sequentially exits cyclones 44, 46 and exits the regenerator vessel 14 through flue gas outlet 47 in flue gas line 48. Regenerated catalyst is carried back to the riser 20 through the regenerated catalyst standpipe 18. As a result of the coke burning, the flue gas vapors exiting at the top of the catalyst regenerator 14 in line 48 contain CO, $CO_2$, $N_2$ and $H_2O$, along with smaller amounts of other species.

Hot flue gas exits the regenerator 14 through the flue gas outlet 47 in a line 48 and enters the power recovery section 60. The power recovery section 60 is in downstream communication with the flue gas outlet 47 via line 48. "Downstream communication" means that at least a portion of material flowing to the component in downstream communication may operatively flow from the component with which it communicates. "Communication" means that material flow is operatively permitted between enumerated components. Many types of power recovery configurations are suitable, and the following embodiment is very well suited but not necessary to the present invention. Line 48 directs the flue gas to a heat exchanger 62, which is preferably a high pressure steam generator (e.g., a 4137 kPa (gauge) (600 psig)). Arrows to and from the heat exchanger 62 indicate boiler feed water in and high pressure steam out. The heat exchanger 62 may be a medium pressure steam generator (e.g., a 3102 kPa (gauge) (450 psig)) or a low pressure steam generator (e.g., a 345 kPa (gauge) (50 psig)) in particular situations. As shown in the embodiment of the FIGURE, a BFW quench injector 64 may be provided to selectively deliver fluid into flue gas line 48.

A supplemental heat exchanger 63 may also optionally be provided downstream of the heat exchanger 62. For example, the supplemental heat exchanger 63 would typically be a low pressure steam generator for which arrows indicate BFW in and low pressure steam out. However, the heat exchanger 63 may be a high or medium pressure steam generator in particular situations. In the embodiment of the FIGURE, conduit 66 provides fluid communication from heat exchanger 62 to the supplemental heat exchanger 63. Flue gas exiting the supplemental heat exchanger 63 is directed by conduit 69 to a waste flue gas line 67 and ultimately to an outlet stack 196, which is preferably equipped with appropriate environmental equipment, such as an electrostatic precipitator or a wet gas scrubber. Typically, the flue gas is further cooled in a flue gas cooler 110 to heat exchange with a heat exchange media which is preferably water to generate high pressure steam and superheated steam. The illustrated example of the FIGURE further provides that conduit 69 may be equipped to direct the flue gas through a first multi-hole orifice (MHO) 71, a first flue gas control valve (FGCV) 74, and potentially a second FGCV 75 and second MHO 76 on the path to waste flue gas line 67 all to reduce the pressure of the flue gas in conduit 69 before it reaches the stack 196. FGCVs 74, 75 are typically butterfly valves and may be controlled based on a pressure reading from the regenerator 14.

In order to generate electricity, the power recovery section 60 further includes a power recovery expander 70, which is typically a single-stage hot gas turbine, and a generator 78. More specifically, the expander 70 has an output shaft that is typically coupled to an electrical generator 78 by driving a gear reducer 77 that in turn drives the generator 78. The generator 78 provides electrical power that can be used as desired within the plant or externally. Alternatively, the expander 70 may be coupled to the main air blower 50 to serve as its driver, obviating driver 52, but this arrangement is not shown.

In an embodiment, the power recovery expander 70 is located in downstream communication with the heat exchanger 62. However, a heat exchanger may be upstream or downstream of the expander 70. For example, a conduit 79 feeds flue gas through an isolation valve 81 to a third stage separator (TSS) 80, which removes the majority of remaining solid particles from the flue gas. Clean flue gas exits the TSS 80 in a flue gas line 82 which feeds a flue gas stream to the expander 70.

To control flow flue gas between the TSS 80 and the expander 70, an expander inlet control valve 83 and a throttling valve 84 may be provided upstream of the expander 70 to further control the gas flow entering an expander inlet. The order of the valves 83, 84 may be reversed and are preferably butterfly valves. Additionally, a portion of the flue gas stream can be diverted in a bypass line 73 from a location upstream of the expander 70, through a synchronization valve 85, typically a butterfly valve, to join the flue gas in the exhaust line 86. After passing through an isolation valve 87, the clean flue gas in line 86 joins the flowing waste gas downstream of the supplemental heat exchanger 63 in waste flue gas line 67 and flows to the flue gas cooler 110.

An optional fourth stage separator 88 can be provided to further remove solids that exit the TSS 80 in an underflow stream in conduit 89. After the underflow stream is further cleaned in the fourth stage separator 88, it can rejoin the flue gas in line 86 after passing through a critical flow nozzle 72 that sets the flow rate therethrough.

In the product recovery section 90, the gaseous FCC product in line 32 is directed to a lower section of an FCC main fractionation column 92. Several fractions may be separated and taken from the main column including a heavy slurry oil from the bottoms in line 93, a heavy cycle oil stream in line 94, a light cycle oil in line 95 and a heavy naphtha stream in line 96. Any or all of lines 93-96 may be cooled and pumped back to the main column 92 to cool the main column typically at a higher location. Gasoline and gaseous light hydrocarbons are removed in overhead line 97 from the main column 92 and partially condensed before entering a main column receiver 99. An aqueous stream is removed from a boot in the receiver 99. Moreover, a condensed light naphtha stream is removed in line 101 while a gaseous light hydrocarbon stream is removed in line 102. Both streams in lines 101 and 102 may enter a vapor recovery section (not shown).

The waste flue gas line 67 delivers flue gas at a pressure of about 7 to about 28 kPa (gauge) (1-4 psig) to the flue gas cooler 110. The flue gas cooler 110 has an outer housing 112 that may contain three discrete heat exchangers. In an embodiment, the flue gas enters the flue gas cooler 110 and indirectly exchanges its heat with heat exchange fluids traveling through passages in each of the three discrete heat exchangers.

The first heat exchanger in the flue gas cooler 110 is a super heat exchanger 114 which comprises heat exchange passages 116 carrying HP steam in line 118 and saturated HP steam from the steam drum 124 in line 144 at a pressure of around 39.4 kg/cm2 (gauge) (560 psig) and a temperature above 232° C. (450° F.). The heat exchange passages 116 may comprise a tube bundle arranged horizontally or vertically and made of chromium-molybdenum (Cr—Mo) steel. The superheat exchanger has a first outer side of passages 116 in downstream communication with the flue gas line 48 and the catalyst regenerator 14 and a second inner side of passages 116 in upstream communication with a steam drum 124. "Upstream communication" means that at least a portion of the material flowing from the component in upstream communication may operatively flow to the component with which it communicates. The HP steam is indirectly heat exchanged against flue gas which may be at an elevated temperature above about 538° C. (1000° F.) to produce super heated steam at over about 399° C. (750° F.) and partially cooled flue gas at a temperature below about 496° C. (925° F.). The superheated steam may be quenched with BFW from line 120 and delivered to the rest of the refinery in line 123.

The partially cooled flue gas enters the second heat exchanger which is an evaporator heat exchanger 122. The evaporator heat exchanger 122 has a first outer side of passages 128 in communication with the flue gas line 48 and the catalyst regenerator 14 and a second inner side of passages in communication with the steam drum 124. The evaporator heat exchanger 122 comprises a steam drum 124 partially protruding from a top of the housing 112 and a lower drum 126 protruding from a bottom of the housing 112. The steam drum 124 is in upstream communication with the superheat exchanger 114 via HP steam line 144 and in downstream communication with the water preheat exchanger 150 via preheat water line 156. The passages 128 may be defined by evaporator tubes that extend horizontally or vertically between the lower drum 126 through an interior of the flue gas cooler 110 to the steam drum 124. Partially cooled flue gas traveling through the interior of the flue gas cooler 110 past the evaporator tubes indirectly heats the preheated liquid water in the evaporator tubes 128 and generates HP steam. The evaporator tubes 128 may be made of carbon steel. Evaporator tubes 128 carry evaporating water from the lower drum 126 to the steam drum 124. The evaporator tubes 128 are equipped with downcorners for transporting condensing water from the steam drum 124 to the lower drum 126. Liquid may be drained from the lower drum 126 in line 134 regulated by a valve. HP steam is collected from steam drum 124 in line 140. A portion of the HP steam in line 142 may be delivered to other uses in the refinery 100 while line 144 delivers HP steam to line 118 carrying HP steam to the super heat exchanger 114 to be super heated. The cooled flue gas leaves the evaporator at a temperature below about 371° C. (700° F.) and preferably below 343° C. (650° F.).

The cooled flue gas enters the third heat exchanger which is a water preheat exchanger 150. The water preheat exchanger 150 comprises heat exchange passages 160 that have a first outer side in downstream communication with the flue gas line 48 and the catalyst regenerator 14 and a second inner side in downstream communication with BFW in line 152. The heat exchange passages 160 may comprise a tube bundle arranged horizontally or vertically and made of carbon steel. The BFW in line 152 is preferably previously preheated to a temperature of about 177° C. (350° F.) to avoid sulfuric acid condensation in the flue gas cooler passages. The desuperheater BFW line 120 carries a portion of the water to join superheated steam in line 123 to control HP steam temperature in line 123 to the refinery 100. The other portion of BFW from line 152 feeds a circuit 154 comprising passages 160 that traverses the interior of the flue gas cooler 110 and indirectly heat exchanges with cooled flue gas therein to provide preheated BFW in line 156. The preheated BFW in line 156 increases to a temperature of above about 204° C. (400° F.) and enters the steam drum 124 while the flue gas is further cooled to below about 327° C. (620° F.). A portion of the water condensing in the steam drum 124 drains into steam drum drain line 158 to complete the circuit 154. The transport of material through the circuit 154 may be assisted by a pump 157. Pump suction line 158 withdraws water from the steam drum 124 and carries it to the circuit 154 for preheating and eventual return to the evaporator heat exchanger 122.

It is also contemplated that the flue gas cooler can be used to make intermediate pressure steam at over 8.5 kg/cm (gauge) (121 psig) prior to preheating the BFW for making HP steam with or without indirect heat exchange between the flue gas and the hydrocarbon feed.

The HP steam in line 118 may be generated by heat exchange with the heavy pump around streams. Optionally preheated BFW in line 170 may be delivered in one branch 172 for indirect heat exchanged with heavy slurry oil in bottoms pump around line 93. A branch 174 may take BFW from line 170 for indirect heat exchange with heavy cycle oil in heavy cycle oil pump around 94. The branches rejoin in line 176 to feed HP steam to line 118 for super heating.

Further cooled flue gas exits the flue gas cooler in line 180 and travels through a diverter valve 182 in upstream communication with a preheat inlet line 184 and a bypass line 186. Preheat inlet line 184 carries flue gas to feed preheat exchanger 188 comprising heat exchange passages 189 having a first side in downstream communication with the catalyst regenerator 14 and the flue gas line 48 and a second side in downstream communication with the hydrocarbon feed line 190. The first side of the heat exchange passages 189 is in upstream communication with an exhaust stack 196. The feed preheat exchanger 188 has an outer housing 191 preferably made of carbon steel. The feed preheat exchanger 188 may be distinct from the flue gas cooler 110. The heat exchange passages 189 may comprise a tube bundle arranged horizontally or vertically and made of carbon steel, stainless steel or Cr—Mo steel. A shell and tube heat exchanger is a preferred type of feed preheat exchanger 188 but other types of heat exchangers may be suitable, such as a plate exchangers. The cooled flue gas is indirectly heat exchanged with hydrocarbon feed from line 190 to provide preheated hydrocarbon feed in line 198 and even further cooled flue gas in line 192. The hydrocarbon feed enters the feed preheat exchanger above about 177° C. (350° F.) and leaves at above about 204° C. (400° F.).

A flow indicator controller monitors flow of hydrocarbon feed in line 190. When the flow of hydrocarbon feed is interrupted such that the flow rate dips below a predetermined value, the diverter valve switches some or all of the flue gas flow to the bypass line 186 which bypasses flue gas around the feed preheat exchanger 188 so as to avoid damage to the feed preheat exchanger 188. Even further cooled flue gas exiting the feed preheat exchanger 188 in a 192 line is joined by bypass line 186 and is transported to a fine solids removal device, such as an electrostatic precipitator 194 to remove catalyst fines to an environmentally acceptable level. The flue gas is then exhausted from the refinery 100 in a stack 196. Even further cooled flue gas leaves the feed preheat exchanger 188 at below about 246° C. (475° F.) and preferably at or below about 232° C. (450° F.) but amply, that is at least 27° C. (50° F.), above the dew point of sulfuric acid at about 177° C. (350° F.). The even further cooled flue gas is at a temperature of about 38° C. (100° F.) lower than the temperature at which flue gas is delivered to the stack 196 in a conventional design. Hence, energy is recovered from an additional 38° C. (100° F.) of flue gas cooling.

Preheated hydrocarbon feed leaves the feed preheat exchanger 188 in line 198 and may also be transported to be indirectly heat exchanged with an FCC product stream such as heavy slurry oil in bottoms pump around line 93. Because the bulk of the hydrocarbon feed preheat is provide by the flue gas, heat in the slurry oil is still available to generate HP steam in line 172 and preheat the hydrocarbon feed stream from below about 216° C. (420° F.) to above about 271° C. (520° F.). Preheated hydrocarbon feed in feed line 200 is delivered to feed distributor 16 of the FCC reactor 12.

It is also contemplated in an embodiment that the feed preheat exchanger 188 be disposed upstream of the flue gas cooler 110 and optionally heat exchangers 62 and 63 in the event that the hydrocarbon feed is desired to be partially or fully vaporized or preheated to an even higher temperature before it is injected into the FCC reactor 12. The feed temperature achievable by heat exchange with the flue gas upstream of the flue gas cooler 110 is greater than achievable by heat exchange with FCC products from the main column 92. Consequently, less coke would need to be generated to support the vaporization of the feed in the reactor 12 with a concomitant reduction in $CO_2$ generation. In this embodiment, one or more of the flue gas cooler 110 and heat exchangers 62 and 63 may be omitted.

EXAMPLE

We prophetically calculated the cost savings associated with heat exchanging flue gas with hydrocarbon feed in and FCC unit which is presented in the Table.

|  | Base Case | Cooling Flue Gas in Flue Gas Cooler and Feed Preheat Exchanger | Increment |
|---|---|---|---|
| HP Steam from Flue Gas, Mt/hr | 74.20 | 66.60 | −7.60 |
| HP Steam from Slurry Oil, Mt/hr | 74.99 | 91.41 | 16.42 |

-continued

|  | Base Case | Cooling Flue Gas in Flue Gas Cooler and Feed Preheat Exchanger | Increment |
|---|---|---|---|
| HP Steam from HCO, Mt/hr | 0.00 | 27.11 | 27.11 |
| Total HP Steam, Mt/hr | 149.20 | 185.12 | 35.92 |
| Benefit; MM$/yr | 44.2 | 54.9 | 10.6 |

By heat exchanging flue gas with hydrocarbon feed, more of the heat in heavy FCC product pump around streams is available for HP steam generation. Almost 36 metric tons per hour more of high pressure steam is made than if the slurry oil pump around is used for all of the feed preheating, resulting in incremental benefits of over ten million dollars per year.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing, all temperatures are set forth in degrees Celsius and, all parts and percentages are by weight, unless otherwise indicated.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An apparatus, comprising:
    a reactor for contacting a hydrocarbon feed with catalyst to produce cracked products and coked catalyst;
    a feed line in communication with said reactor for carrying hydrocarbon feed to said reactor;
    a catalyst pipe in communication with said reactor for carrying regenerated catalyst to said reactor;
    a regenerator for combusting coke from the coked catalyst to produce regenerated catalyst and flue gas;
    a coked catalyst pipe in communication with said reactor and said regenerator for carrying coked catalyst to said regenerator;
    a flue gas line for carrying flue gas from said regenerator;
    a flue gas cooler comprising a heat exchanger with heat exchange passages having a side in communication with the flue gas line; and
    a feed preheat exchanger having a first side in communication with said flue gas line and a second side in communication with said feed line for heat exchanging the flue gas with the hydrocarbon feed.

2. The apparatus of claim 1 comprising a bypass line that bypasses said feed preheat exchanger.

3. The apparatus of claim 2 comprising a diverter valve in communication with said flue gas line and said bypass line.

4. The apparatus of claim 1 comprising a superheat exchanger having a first side in communication with a steam drum and a second side in communication with said flue gas line.

5. The apparatus of claim 1 comprising an evaporator heat exchanger having a first side in communication with a steam drum and a second side in communication with said flue gas line.

6. The apparatus of claim 1 comprising a water preheat exchanger having a first side in communication with a water line and a second side in communication with said flue gas line.

7. The apparatus of claim 1 comprising a superheat exchanger having a first side in communication with a steam drum and a second side in communication with said flue gas line; an evaporator heat exchanger having a first side in communication with said steam drum and a second side in communication with said flue gas line; and a water preheat exchanger having a first side in communication with a water source and a second side in communication with said flue gas line.

8. The apparatus of claim 7 wherein said steam drum is in upstream communication with said superheat exchanger and in downstream communication with said water preheat exchanger.

9. The apparatus of claim 1 wherein a second feed preheat exchanger has a first side in communication with said feed line and a second side in communication with a heavy FCC product line.

10. An apparatus for recovering heat from a flue gas from a catalyst regenerator comprising:
a flue gas cooler comprising a superheat exchanger having a first side in communication with said regenerator and a second side in communication with a steam drum;
an evaporator heat exchanger having a first side in communication with said regenerator and a second side in communication with said steam drum; and
a water preheat exchanger having a first side in communication with said regenerator and a second side in communication with a water line; and
a feed preheat exchanger having a first side in communication with said regenerator and a second side in communication with a hydrocarbon feed line.

11. The apparatus of claim 10 wherein the steam drum is in upstream communication with the superheat exchanger and in downstream communication with said water preheat exchanger.

12. The apparatus of claim 10 wherein the superheat exchanger, the evaporator heat exchanger and the water preheat exchanger comprise a steam generator that is distinct from said feed heat exchanger.

13. The apparatus of claim 10 wherein the first side of the feed preheat exchanger is in communication with an exhaust stack.

14. The apparatus of claim 10 wherein a bypass line in communication with said regenerator bypasses said feed preheat exchanger.

15. The apparatus of claim 14 wherein a diverter valve is in communication with said bypass line and said feed preheat exchanger.

16. An apparatus, comprising:
a reactor for contacting a hydrocarbon feed with catalyst to produce cracked products and coked catalyst;
a feed line in communication with said reactor for carrying hydrocarbon feed to said reactor;
a catalyst pipe in communication with said reactor for carrying regenerated catalyst to said reactor;
a regenerator for combusting coke from the coked catalyst to produce regenerated catalyst and flue gas;
a coked catalyst pipe in communication with said reactor and said regenerator for carrying coked catalyst to said regenerator;
a flue gas line for carrying flue gas from said regenerator;
a feed preheat exchanger having a first side in communication with said flue gas line and a second side in communication with said feed line for heat exchanging the flue gas with the hydrocarbon feed; and
a bypass line that bypasses said feed preheat exchanger.

17. The apparatus of claim 16 comprising a diverter valve in communication with said flue gas line and said bypass line to switch flow from said flue gas line to said bypass line.

\* \* \* \* \*